(12) United States Patent
Bowker et al.

(10) Patent No.: US 6,873,716 B1
(45) Date of Patent: Mar. 29, 2005

(54) CONFOCAL-REFLECTION STREAK LIDAR APPARATUS WITH STRIP-SHAPED PHOTOCATHODE, FOR APPLICATIONS AT A WIDE RANGE OF SCALES

(75) Inventors: J. Kent Bowker, Essex, MA (US); Stephen C. Lubard, Woodland Hills, CA (US); John W. McLean, Tucson, AZ (US)

(73) Assignee: Areté Associates, Sherman Oaks, CA (US)

( * ) Notice: Subject to any disclaimer, the term of this patent is extended or adjusted under 35 U.S.C. 154(b) by 0 days.

(21) Appl. No.: 09/125,259

(22) Filed: Nov. 4, 1999

Related U.S. Application Data

(63) Continuation of application No. PCT/US95/15491, filed on Nov. 14, 1995.

(51) Int. Cl.[7] .............................................. G06K 9/00
(52) U.S. Cl. ........................ 382/128; 356/441; 424/9.6; 600/310
(58) Field of Search ........................ 382/100, 128–134, 382/154, 173, 174, 195, 254–255, 312; 250/330–332; 340/946; 73/625; 348/31, 81; 356/4.01, 441, 446; 424/9.6; 435/6

(56) References Cited

U.S. PATENT DOCUMENTS

| | | | | |
|---|---|---|---|---|
| 5,013,917 A | * | 5/1991 | Ulich | 250/330 |
| 5,086,816 A | * | 2/1992 | Mieth | 141/83 |
| 5,134,884 A | * | 8/1992 | Anderson | 73/625 |
| 5,231,401 A | * | 7/1993 | Kaman et al. | 250/332 |
| 5,270,780 A | * | 12/1993 | Moran et al. | 313/373 |
| 5,276,632 A | * | 1/1994 | Corwin et al. | 703/2 |
| 5,359,403 A | * | 10/1994 | Grosmann et al. | 340/946 |
| 5,696,577 A | * | 12/1997 | Stettner et al. | 250/332 |
| 5,698,397 A | * | 12/1997 | Zarling et al. | 435/6 |
| 5,712,678 A | * | 1/1998 | Hofmann | 348/117 |
| 5,751,243 A | * | 5/1998 | Turpin | 250/370.08 |
| 5,799,656 A | * | 9/1998 | Alfano et al. | 600/473 |
| 5,853,370 A | * | 12/1998 | Chance et al. | 600/473 |

* cited by examiner

Primary Examiner—Jayanti K. Patel
(74) Attorney, Agent, or Firm—Peter I. Lippman

(57) ABSTRACT

The system images the volume of a turbid medium and detects the contents. The medium can be water or air, or living tissue, or almost any other material which is at least partially light-transmissive. The system includes a light source for producing a series of discrete fan-shaped pulse beams that are substantially uniform in intensity or have been peaked at the edges of the fan to illuminate sections of the medium, a streak tube with a large, thin-slit-shaped photocathode for collecting the maximum amount of light from weak returns, a field-limiting slit disposed in front of the cathode for removing multiply scattered light, a large-aperture optical element for collecting and focusing the reflected portions of the pulse beam on the field-limiting slit and the cathode, and an array of detectors. A volume display of the medium is generated by translating the transmitter and receiver normal to the longitudinal axis of the pulse beam, to illuminate adjacent sections of the medium, and combining the sections to provide a volume display. All, or substantially all, of the light returned from each pulse beam is used. Vehicle motion can be used to provide the scan of the beam. Applications range from foggy sky surveillance at multiple-kilometer scale to location of fractional-millimeter tumors in a human breast.

32 Claims, 10 Drawing Sheets

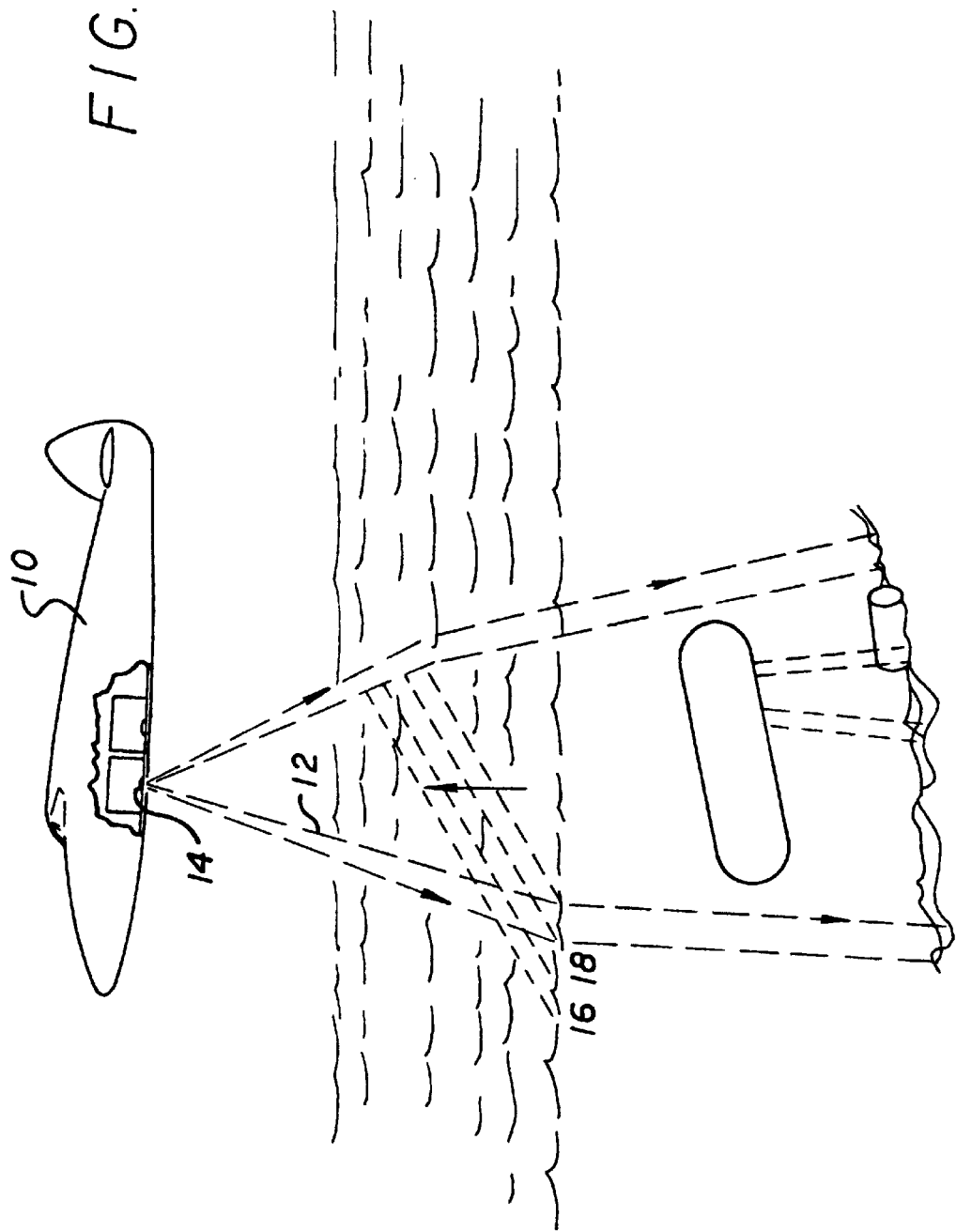

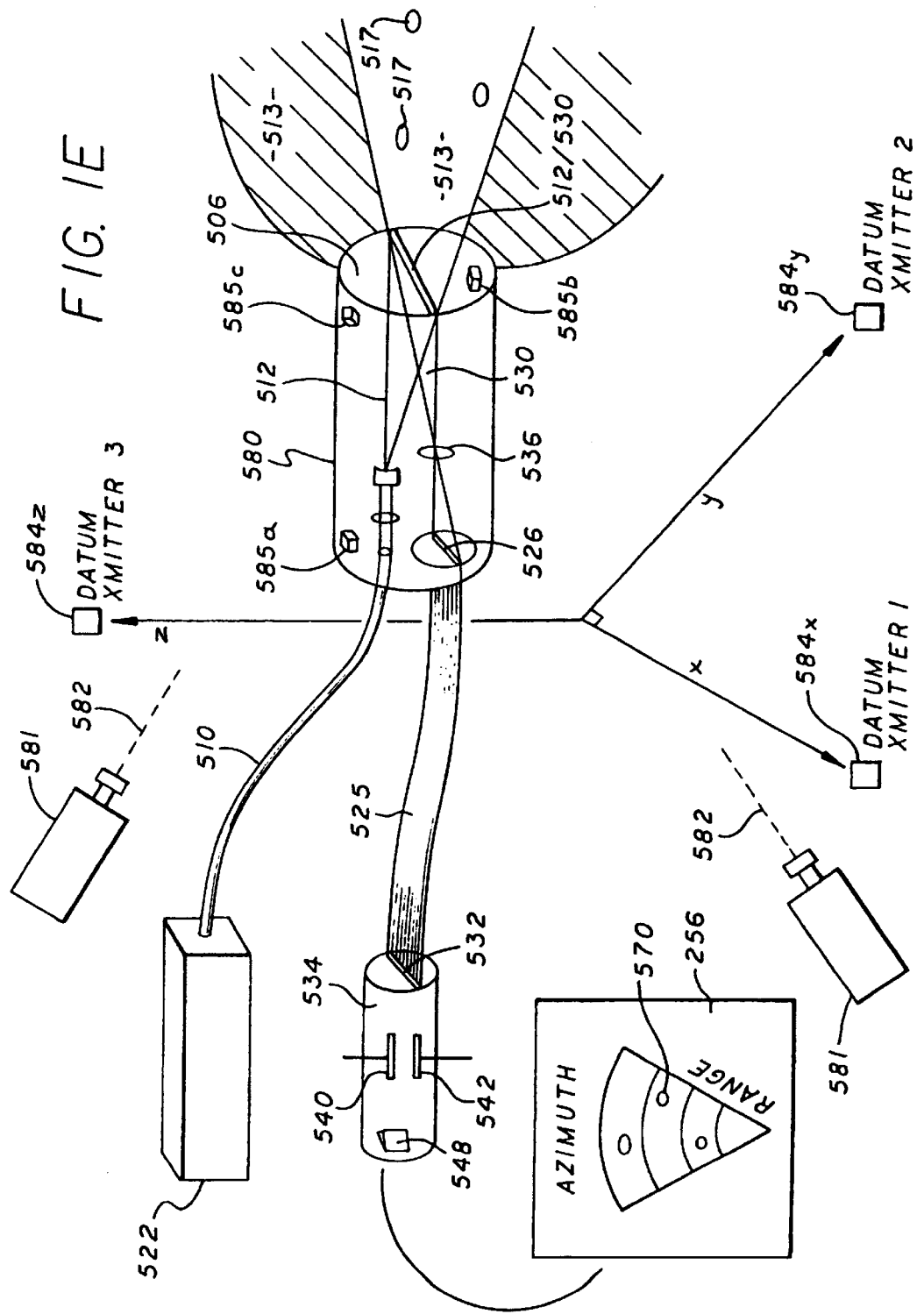

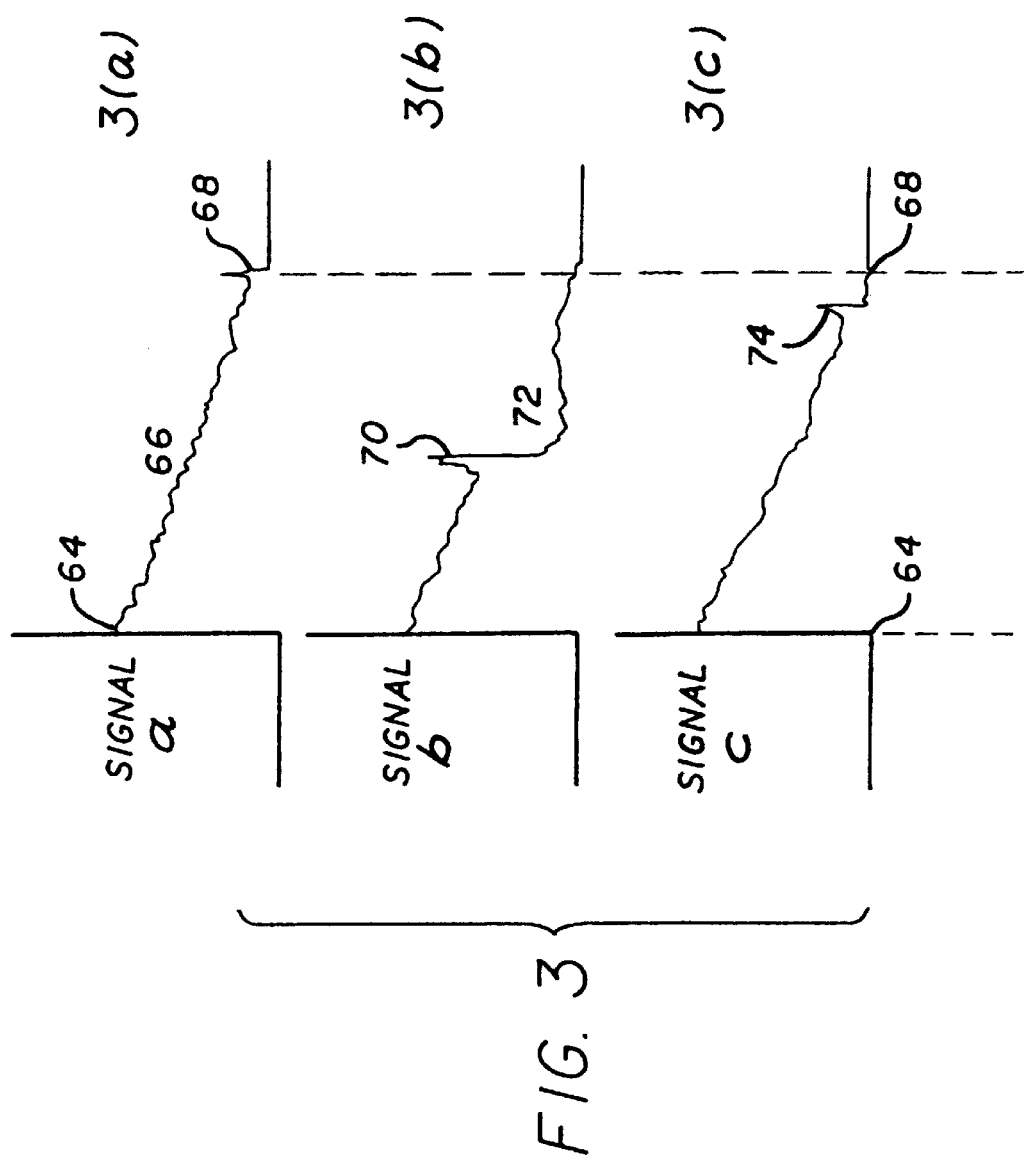

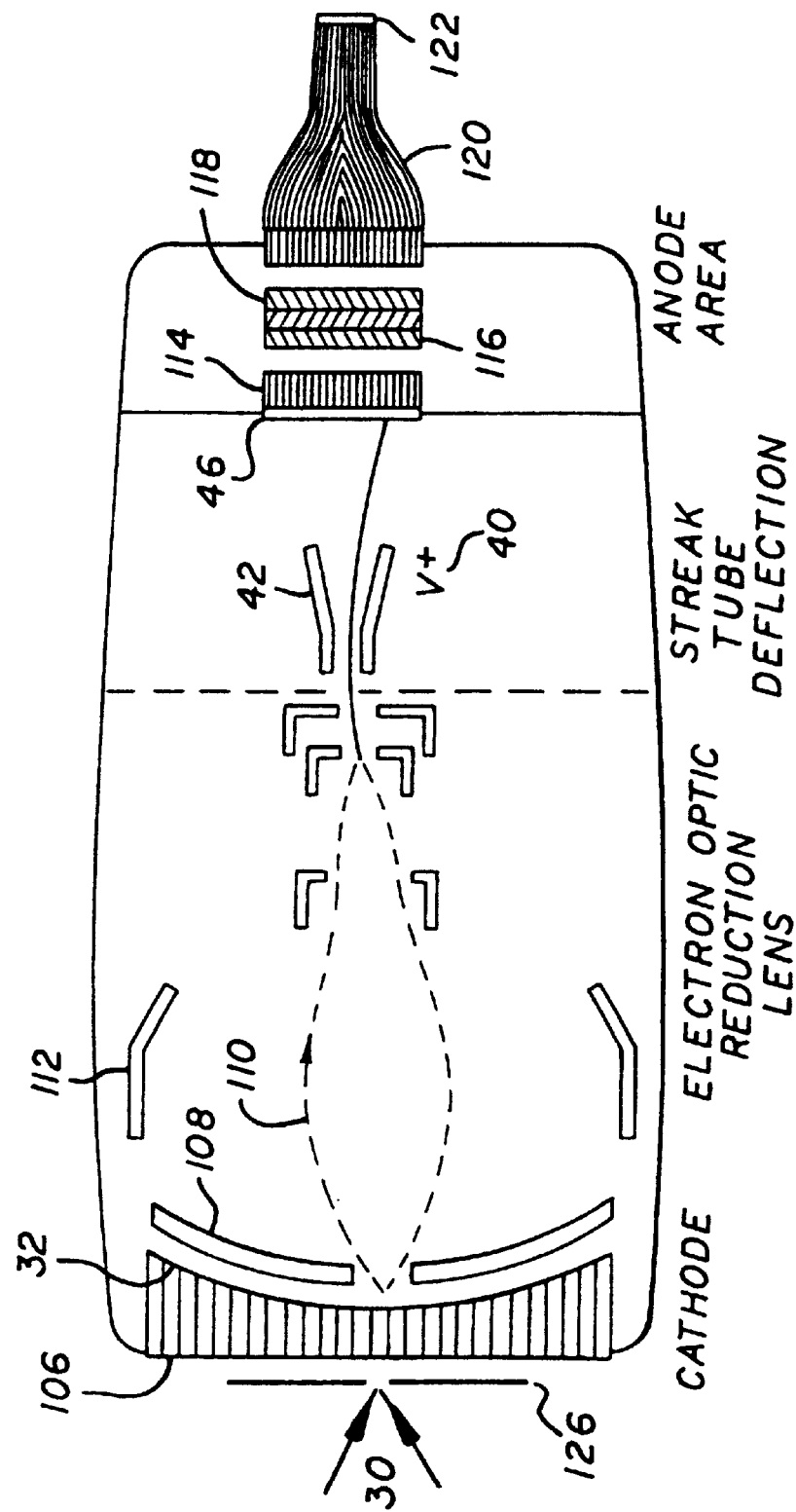

US 6,873,716 B1

CONFOCAL-REFLECTION STREAK LIDAR APPARATUS WITH STRIP-SHAPED PHOTOCATHODE, FOR APPLICATIONS AT A WIDE RANGE OF SCALES

This application is continuation of PCT/US95/15491, filed Nov. 14, 1995.

BACKGROUND

1. Field of the Invention

This invention relates generally to imaging the volume of a turbid medium, together with objects embedded or suspended in such a medium; and more particularly to use of streak-lidar apparatus to monitor phenomena at an extremely broad range of scales—including detection of a tumor less than a millimeter across, in living tissue; or an underwater object in the ocean, or vehicles in fog, or a variety of other objects in turbid media.

2. Prior Art

The present invention has applications spanning a range of sizes, and is believed to integrate diverse, heretofore nonanalogous fields. For reasons to be explained in this document, these fields have not previously been linked.

These application fields include imaging of volumes of the atmosphere with aircraft moving through such volumes—over a range (and atmospheric volume) on the scale of kilometers. It also includes imaging of ocean volumes—together with submarines, sunken ships, submerged fuel drums and the like, over a field of examination that is some one to two kilometers wide and perhaps many kilometers long.

In addition these applications include medical imaging of human or animal tissue, with tumors in the tissue. The tumors may be a small fraction of a millimeter in diameter, either suspended within the living tissue or growing on human or animal organs at a remote interior surface of the tissue. Here the volumes of tissue that can be imaged range from perhaps two to twenty centimeters across.

Intermediate-scale applications include imaging of a fogged-in airport and its environs, together with the land and air vehicles and other structures in the area, or imaging of a riot zone (or battlefield) filled with tear gas or other nebulized material—together with people, vehicles and the like in that zone.

These many types of imaging have not heretofore been linked. Probably the reason for this is that prior artisans have not fully appreciated how to use lidar to obtain a direct distance-to-depth mapping in a simple natural real-time display, capable of direct volume implications.

At a medical or laboratory scale, most previous users have instead become entangled in fiber-optic encoders and other counter-productive digressions. Furthermore, most or all previous workers in lidar have failed to appreciate the critical importance of the confocal condition—though that condition is recognized in other fields. (By "confocal condition" we refer to configurations that cause emitted and reflected probe beams to lie very nearly coincident upon one another.)

An example of failure to appreciate the importance of that condition appears in U.S. Pat. No. 4,704,634 of Kato—who actually uses a pulsed, unconstrained spherical wave (or "flood beam") as his emitted beam. Accordingly bench-scale lidar configurations have not been reasonably optimized.

At ocean-volume scale, lidar systems heretofore have not been made effective at all. In this case, in addition to the failures of recognition outlined in the preceding paragraph, previous workers have evidently overlooked the potential use of streak lidar.

U.S. Pat. No. 3,719,775 (predating the invention of the streak tube) to Takaoka, addressing terrain-imaging applications, mentions in passing the use of a vertical fan-shaped beam, carried by an aircraft with the wide dimension of the beam at right angles to the direction of motion. That configuration is not Takaoka's invention, and he teaches nothing about its effective use.

Heretofore neither Takaoka nor any other artisan has proposed use of such a fan-shaped beam, projected from aircraft—either with a streak tube, or with any other effective means of reading terrain-generated reflection.

The point of commonality in all the applications, at different scales, mentioned earlier is the magnitude of the effective turbidity on a per-unit-distance (or –volume) basis. This is the consideration that controls ability to probe and resolve turbid media with a pulsed laser and a streak tube. Thus ocean volumes while vastly greater in extent than living tissue are correspondingly lesser in turbidity.

Several techniques have evolved over the years for overcoming the problems associated with detecting targets in a light-scattering medium.

Ocean-volume scale—One technique uses a narrow beam from a pulsed laser, such as a doubled YAG, to scan the ocean. Generally, the beam transmitter and the receiver aperture, which must be quite large to collect sufficient energy, are scanned together, using scanning mirrors or other devices such as prisms.

The energy received from each pulse is detected with a photomultiplier, or similar quantum-limited device, and the resulting signal is amplified with a logarithmic-response amplifier, digitized and then processed. Because the pulses are short, typically 10 nanoseconds, the detection electronics must be very fast, digitizing at 200 MHZ or faster.

Since the pulse rate is low, the processing rates required to analyze the data from each pulse are within the state of the art. Such methods require the use of mechanical scanners that are slow and difficult to build, particularly if they are to be mounted on aircraft.

In accordance with a primary advantage of the present invention, the need for fast digitizing electronics and mechanical scanners is eliminated. (As will be seen, however, in certain of the applications outlined above, at least in principle fast electronics can be substituted for a streak tube.)

Another technique is range gating, which uses a pulsed flood beam and a number of gated image intensifiers with charge-coupled devices (CCDs). The intensifiers are gated on when the beam pulse reaches a specific depth.

Typically one gate is applied just as the pulse beam that encounters the object returns to the receiver, so that the full reflected return is obtained. A second intensifier is gated on a little later to detect the shadow of the object. The image of the target is obtained by taking the difference of the two images, which then eliminates the seawater backscatter and enhances the target signature.

Several drawbacks are associated with the range-gating technique. Range gating does not allow utilization of all, or substantially all, of the information returned from each pulse to create three-dimensional data sets.

Rather in such prior-art systems, although a volume of the medium is illuminated, by range gating only one specified layer (depth increment) of the illuminated medium is selected. Thus the signal above and below the range gate is rejected—discarded.

As will be clear, of the energy transmitted into the volume of the medium and returned toward the transceiver, only a small fraction is used. This operating arrangement constitutes a monumental waste of optical energy.

Additionally, a full-depth data set cannot be created from a single pulse. Rather, full-depth information can be obtained only by collecting many pulses, during which process the platform, aircraft or other vehicle must remain stationary. (To create a full-depth image, the number of shots required is a large multiplicity. Consideration of this fact is another way of appreciating the amount of energy wasted.)

Despite the availability of such techniques, existing lidar systems are limited by the size of the receiver optics that can be used in a scanner. Generally the light reflected from targets that are deeply positioned, or suspended in a very turbid medium, is weak.

Although large-diameter optics can aid in maximizing the amount of light collected from weak returns, the size of the optics that can be used in a scanner is restricted by the size of the moving prisms or mirrors. Such cumbersome mechanisms sometimes can be eliminated, as in selected applications of the present invention, by utilizing the motion of a vehicle—e. g., boat or aircraft—carrying the system so that the dimensions for scanning can be reduced to one.

The scanning problem, however, is still formidable and restricts the size of the apertures that can be used. Moreover, volume scanning systems are very expensive, and require considerable power and weight. Consequently, for large-scale applications the ability to install such systems in aircraft or other vehicles is restricted.

Furthermore, those systems that utilize range gating, instead of volume scanning, suffer from poor range resolution and area coverage. When a target object is at a different depth from the expected, the optical return is subtracted as well as the background, and poor performance results. Additionally, very large pulse energies are required to obtain signal-to-noise ratios sufficient for detecting objects at even moderate depths.

What has been needed heretofore is an imaging system that provides an accurate and reliable image of a suspended object, eliminates the problems associated with mirror scanning for large-scale systems, and utilizes all, or substantially all, of the information returned from each pulse to eliminate laser-energy waste.

Medical scale—Streak tubes have been demonstrated in transillumination geometries to detect the presence of small tumors in tissues (see, e. g., U.S. Pat. Nos. 5,278,403 and 5,142,372 to Alfano; and U.S. Pat. No. 5,140,463 to Yoo). The transillumination technique, however, yields only two-dimensional images and cannot determine the depth of a tumor.

Furthermore, transillumination yields only a shadow signature. Such data are subject to relatively poor detection range.

As can now be seen, in the field of the invention the prior art has failed to provide solutions to important difficulties of observing the operating environment and receiving communications.

SUMMARY OF THE DISCLOSURE

The present invention corrects the failings of the prior art. The invention provides an imaging system for detecting an object in a turbid medium—such as living tissue, or water or air. The invention is useful in probing the contents of any turbid medium through which light can pass, even if absorbed and scattered, as long as some return can be obtained.

The system includes a means for generating a periodic series of discrete pulse beams in the shape of fan beams, each of which is substantially uniform in intensity—or with greater amounts of energy at the ends of the fan to compensate for losses due to the greater distance—to illuminate sections of the medium.

In operation, a single pulse beam is emitted to illuminate a section of the medium. A large-aperture optic collects the back-reflected portions of the pulse beam and focuses the reflected portions on a field-limiting slit. That slit, located in front of the photocathode, rejects multiply reflected light.

For best measurement performance it is very important that the successive depths illuminated by the pulsed beam—i. e., the incremental volumes, transverse-needle-shaped probe volumes through which the beam successively passes—all be imaged in common back to the slit. This condition is most straightforwardly met by arranging the collecting optics to receive light through a second fan-shaped volume that at least nearly coincides with the volume of the transmitted fan-shaped pulse beam.

A lens, positioned between the field-limiting slit and photocathode, reimages the image on that onto the photocathode. Coupled to the streak tube is an imaging detector, typically a CCD, which detects signals generated by the streak tube in response to the reflected portions of the pulse beam impinging on the photocathode.

Other imaging detectors, such as a TV camera or photo-diode array, may be used instead. To obtain a volume display of the medium, the pulsed beam can be repeated while its physical location and that of the reflection are shifted together—for example by moving the generating means and receiver normal to the longitudinal axis of the pulse beam so that each pulse illuminates adjacent sections of the turbid medium.

A volume display is thus generated by combining the returns from adjacent sections of the medium. All, or substantially all, of the light returned from each pulse is used—unlike the situation previously described for range-gating systems.

The streak-tube photocathode is substantially a thin strip behind a field-limiting slit on which the illuminated strip of the ocean, or other scattering medium, is imaged by the receiver optics. That strip is essentially fixed, unlike for example the system of the Kato patent discussed earlier—which requires a rectangular photocathode to accommodate the migrating, electronically shifted region, on the cathode, from which the downstream streak-tube components will draw their signal.

In the present system, since the strip is fixed we say that the cathode is "substantially a thin strip". It is to be understood that this language encompasses use of a rectangular cathode if only a thin-strip section is used.

The thin-strip, in either case, is fixed in location on the cathode surface—but should be wide enough to accept the entire image when the slit is opened to its maximum width. A variable-width slit is very desirable, providing easy adjustment for optimal viewing over a wide variety of turbidity conditions and detection ranges. This condition, closely related to the confocal geometry mentioned earlier, has been ignored in many prior-art systems.

When the laser beam pulse, typically a few nanoseconds in duration for ocean scanning and one or a few picoseconds for medical and laboratory applications, returns to the receiver from the near surface of the medium, the electronic sweep of the deflecting system is initiated.

The following time history of the returning signal spread across the lateral surface of the tube anode is then a record of the reflection from the medium itself. The image includes any bodies embedded in the medium, such as mines or submarines in the ocean or tumors in living tissue. The image also includes the reflection from the near surface of each such object, and the shadow below the object.

Because the slit-shaped cathode is long and covers the width of the ocean illuminated by the fan-shaped beam from the laser, the image on the anode phosphor or area detector is a wide vertical section of the ocean or other medium. In addition to imaging objects fully embedded—e. g., immersed and floating—in the medium, the invention also applies to imaging objects on the bottom (for the ocean) or at a far interior surface of the medium, and to obtaining a profile of bottom or far-surface topography.

This may be the only way to distinguish silt-covered objects such as archaeological remains lying on the bottom of the ocean, or tumors growing on a living organ in a human or animal body, from the bottom or the organ itself. Even the gross relief of the sea bottom or of an organ can be imaged, often quite plainly, by this process.

For ocean or air scanning the invention described herein can be employed, for example, from a fixed-wing aircraft or helicopter, from boats on the water surface, or from submerged vehicles for search at great depths—or from a fixed tower, as appropriate. A tower may be best for imaging, as an example, aircraft in fog at an airport.

The invention is equally applicable to the analysis of very small volumes using very short laser pulses, on the order of a picosecond duration for example, since the streak tube can capture such time intervals. These volumes, and the objects in them, may be for example submillimeter tumors in a human breast that is only, say, 2 to 20 cm thick. In the case of relatively thick tissue, imaging inward from two or three different surfaces may be necessary.

As previously mentioned, the linking of these divergent applications at several different ranges of scale is believed to be novel. With respect to the prior art, we are not aware of suggestion of any single technology for use in these several volume-size ranges, which thus represent nonanalogous arts.

The image on the anode can be photographed by a CCD camera or similar device, particularly by logarithmic-response area-array CCD-like detectors. Bitwise, the image is read out slowly, but all in parallel, compared with the rapid progress of the returning signal which is serial with respect to the sweep direction of the streak tube. The anode can also be replaced by a thinned backside-illuminated CCD.

Either technique for acquiring pixel-based images facilitates viewing of the phenomena on a cathode-ray screen directly or, after encoding the signal, processing such images to enhance them. Those versed in the art are aware of various enhancement techniques, such as subtracting the mean return from all the return values for a recorded section of the medium.

Subsequent display of such sections can be manipulated by adding many sections together to provide a three-dimensional view of the breast, or airport environs, or underwater scene. Such three-dimensional data sets are obtained by moving the sensor system normal to the fan beam between each exposure, so that each sectional image is from an adjacent section of the medium.

Besides giving an overall picture of the situation, this technique also enhances detection (and reduces false alarms) by enabling operators or programmed computers to notice small or fragmentary images, near the electronic detection limit, that might not be apparent in any single section image.

All of the light recaptured is utilized in creating three-dimensional data sets. This characteristic of the system avoids wasting energy from the laser.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1A is similar but more specifically employing an aircraft as the moving platform to view objects underwater;

FIG. 1E is a highly schematic showing, with some portions generally in perspective or isometric projection, and other portions merely diagrammatic, of a handheld medical probe with associated equipment;

FIGS. 3(a) through (c) are timing diagrams showing signals obtained through using the systems of FIGS. 1 through 2;

FIG. 6 is a schematic diagram of the detection system of the FIG. 2 system.

DETAILED DESCRIPTION OF THE PREFERRED EMBODIMENTS

Figure 1:
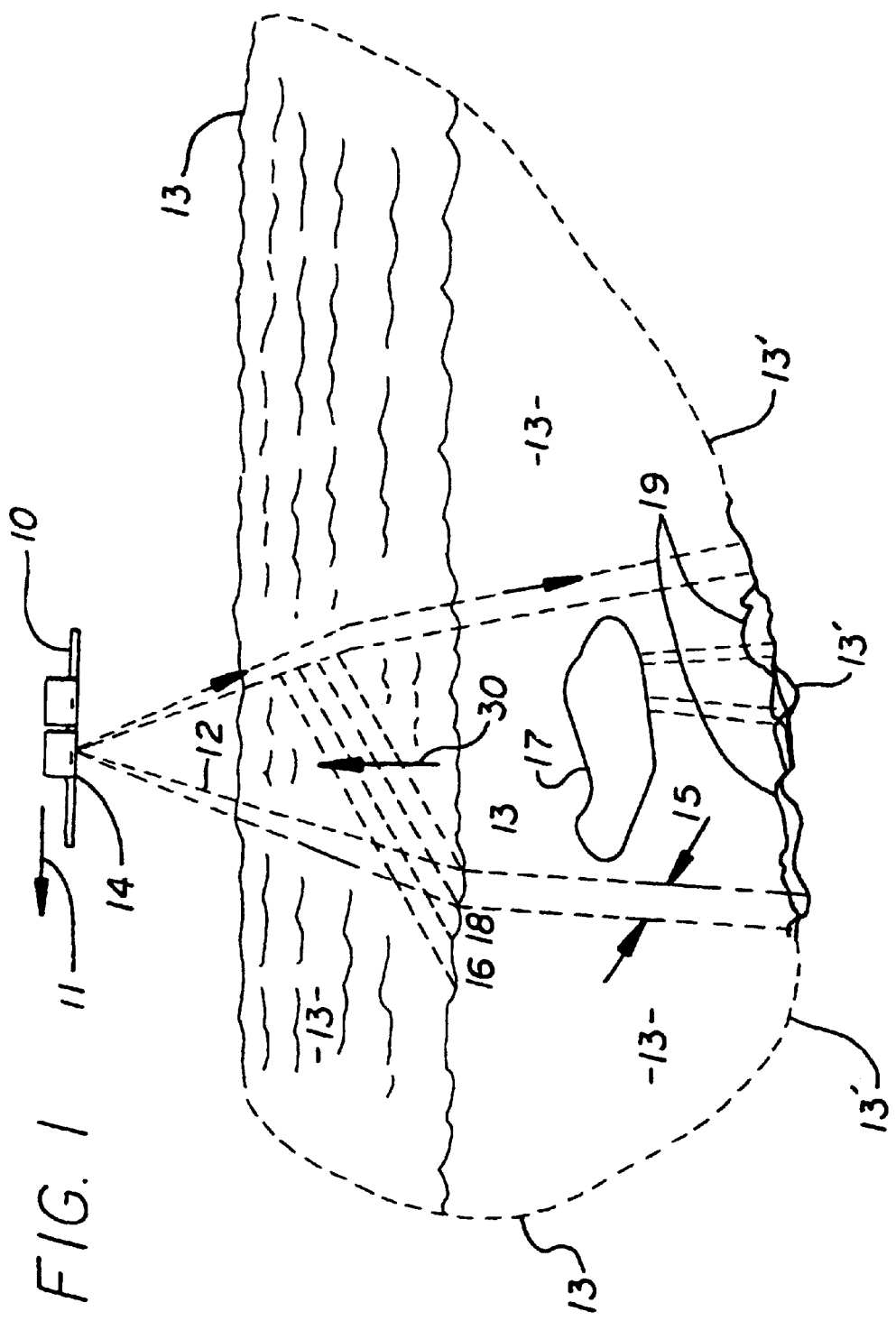
FIG. 1 is a generalized schematic elevational showing of a preferred embodiment that employs a moving platform to translate the apparatus of the invention, to scan objects in a turbid medium.

The present invention provides a system for detecting targets located in a light-reflecting medium, such as dirty, hazy or foggy air; and such as water or living tissue. The system can be used to observe a water interface, the structure of the medium—including the distribution of particulate matter and suspended or otherwise embedded bodies—and a bottom or far-interior-surface profile. More particularly the invention can be used to detect objects in any medium through which light can pass, even if absorbed and scattered, provided that some substantially directly reflected light can be obtained.

The system includes a light source for producing a series of discrete narrow, fan-shaped pulse beams which have a modified non-uniform intensity distribution to produce uniform signal-return. The reflected portions of the pulse beam are received by a detection system comprising receiving optics, a streak tube and an imaging area detector.

In operation, the invention by some means physically shifts the emitted or received beams together. To say this more precisely, the invention shifts (e. g., translates) the positions of at least portions of both the emitted and reflected beams together. For example the apparatus of the invention may be mounted on a platform (such as a vehicle) adapted for movement along the turbid medium. A light source emits periodic pulse beams to illuminate a succession of thin slices of the turbid medium.

The detection system includes a light-collecting optical element, a field-limiting slit, a streak tube and an imaging area detector. The light-collecting optic receives reflected light and images it onto a field-limiting slit, which rejects multiply scattered light.

A lens or other focal element, disposed between the field-limiting slit and the photocathode of the streak tube, is preferably used to focus the image at the slit onto the photocathode. Because of the narrow fan-shaped illumination and the field-limiting slit at the cathode, the light collected is substantially directly reflected light, and not light multiply reflected by the medium—thus providing improved image contrast.

To collect the maximum amount of light from weak returns, the aperture of the optic should be as large as possible. The streak-tube photocathode, however, should be big enough to encompass the image of the fan-beam-illuminated volume.

For this purpose the cathode itself may be slit-shaped, with a very large aspect ratio such as 200:1 or 300:1 so as to avoid wasting expensive sensitive surface area, and thus to economically do its job. If the cathode happens to have a much lower aspect ratio, even 1:1, the system uses only a slit-shaped portion—generally fixed in position, but of variable width as will be explained.

Inside the streak tube, a cross-sectionally slit-shaped stream of photoelectrons emitted from the cathode is accelerated and then electrostatically focused on the phosphor layer or anode of the streak tube. On passage from the cathode to the anode, the photoelectrons pass through a deflecting electric field, whose strength is ramped to sweep the photoelectrons across the anode.

The ramping deflection field is created by a varying voltage applied to the deflecting plates in the tube.

The result at the anode is a two-dimensional signal, the resultant of (1) the temporal variation of the detected light reflected from progressively deeper regions of the turbid medium, in one dimension, and (2) the lateral variation in intensity of the reflected light along the narrow, fan-shaped pulse beam in the perpendicular dimension.

The focused electrons can be sensed directly by an area detector, such as a thinned backside-illuminated CCD. Alternatively the electron energy can be converted to light by a phosphor layer on the anode, and the light emitted from the phosphor then passed to a detector array.

A volume display of the medium is generated by coordinating the return signals for successive transmitted/reflected beams with the beam positions. As mentioned earlier, the two beams are shifted together while the laser is repetitively pulsed.

This shifting can be accomplished in either of two basic ways: by translating (or rotating) the transmitter and receiver together, or (2) by translating or rotating an optical element, most commonly a mirror, that controls the beam positions. Motion preferably is normal to the long dimension of the fan-shaped pulse beam, so as to illuminate adjacent sections of the medium with best efficiency (and compactness of the imaged volume).

In the first case, the motion of a vehicle is used to provide the scan or motion of the fan-shaped pulse beam and the likewise fan-shaped volume through which the return beam is collected.

In either case, all or substantially all of the light returned from each pulse is used to create three-dimensional data sets. The coordination of signals with beam positions to provide a volume display can be accomplished by simply displaying (or analyzing) the resulting successive two-dimensional signals sequentially, with a comparable time base.

The result is to show (or automatically evaluate without showing) a kind of movie that emulates a virtual visual experience (or data-collection process) of travel through the medium. The movie can be run and watched in real time while data are collected, or later at actual speed, or faster or slower, or in stop frames, just as an ordinary video is shown.

Alternatively the data can be instead processed to produce a two-dimensional picture of the three-dimensional volume of the medium—in perspective or isometric, or any other viewing mode preferred—using any of the myriad available computer programs for visualizing three-dimensional bodies.

If desired, through holographic projection an actual three-dimensional image can be formed and viewed. Many other uses of the incrementally collected volumetric data will now be clear to those skilled in the relevant arts.

By using very short pulses, on the order of one to a few picoseconds in duration for example, the present invention can be used to resolve correspondingly very small objects. The streak tube collects the rapid return of the backscattered light, distributing the return in space and then reading the return out slowly.

The return is in the low-nanoseconds and medium-to-high-pico-second range, and the system of this invention allows a readout in milliseconds, thus obviating the necessity for faster electronic readouts.

At relatively long ranges, on the other hand, such as the ranges suitable for airborne surveillance of ocean volumes, modern electronics actually is fast enough to allow dispensing with the streak tube entirely, and simply using a very fast frame cache to collect the data—serially with respect to the narrow dimension of the slit. This system is within the scope of certain of the appended claims. The cache can be read out entirely in parallel, just as is done with the streak tube in other embodiments of the invention.

With a streak tube, all of the signal from each pulse of the fan-shaped pulse beam width and depth that is back-reflected is observed at once, avoiding the need to use a multiplicity of pulses to obtain three-dimensional information.

Normally, laser beams are nonuniform in intensity, with maximum intensity at the center of the beam and minimum at the outermost edges. This can be changed by applying tapered coatings to the laser mirrors, or by the use of optical means external to the laser.

An optical inverter, comprising a series of lenses and a diamond-shaped mirror arrangement, enhances the intensity at the outer portions of the pulse beam by optically inverting in one dimension along the fan width the intensity pattern of the pulse beam. The result is a pulse beam that compensates for the effect caused by longer paths at the ends of the fan to produce a signal return that is substantially uniform in intensity.

FIG. 1 shows a representative configuration for embodiments of the invention in which the two beams are displaced together by actual bodily physical translation of the transmitting and receiving apparatus. A moving platform or stage 10 carries the apparatus 14 of the invention—i. e., mainly the laser, streak tube, electronics, and associated optics.

A narrow, fan-shaped pulse beam 12 is projected from the transmitter to the medium 13, with the long dimension of the beam normal to the direction 11 of platform motion. The beam 12 illuminates a thin section 15 in the medium.

The beam picks out reflections and shadows for objects 17 that are fully immersed or embedded in the medium 13, as well as irregularities and objects 19 at the far interior surface 13' of the medium 13.

Coverage of a volume of the medium is obtained by issuing a series of discrete pulse beams 16–18 to illuminate adjacent sections of the medium. During (or after) processing of the successive section images, the sections can be displayed to show a scan through a volume of the medium.

Thus the motion 11 of the platform 10 carrying the system 14 is used to provide the scan of the pulse beam. The pulse rate to generate the series of discrete beams is set by the platform velocity.

In general, the rate may be high and the beam width 15 at the surface of the medium narrow compared with the resolution determined by the image-detector pixels. This is done to preserve temporal resolution, which can be reduced if the spatial width becomes large. In order to reduce the number of readouts of the CCD, the pulses can be accumulated on a chip.

FIG. 1A is a direct extension of FIG. 1 to the case in which the platform is an aircraft and the medium is the ocean. Objects of particular interest in this case, as suggested in the drawing, may be submarine craft, bottom-tethered submarine platforms, drums of waste or fuel, etc. The system may also, however, be used to locate and monitor whales, or large schools of fish—or even contaminants released in great quantity in the case of spills, if sufficient difference of reflectivity relative to the seawater is available.

Figure 1B:
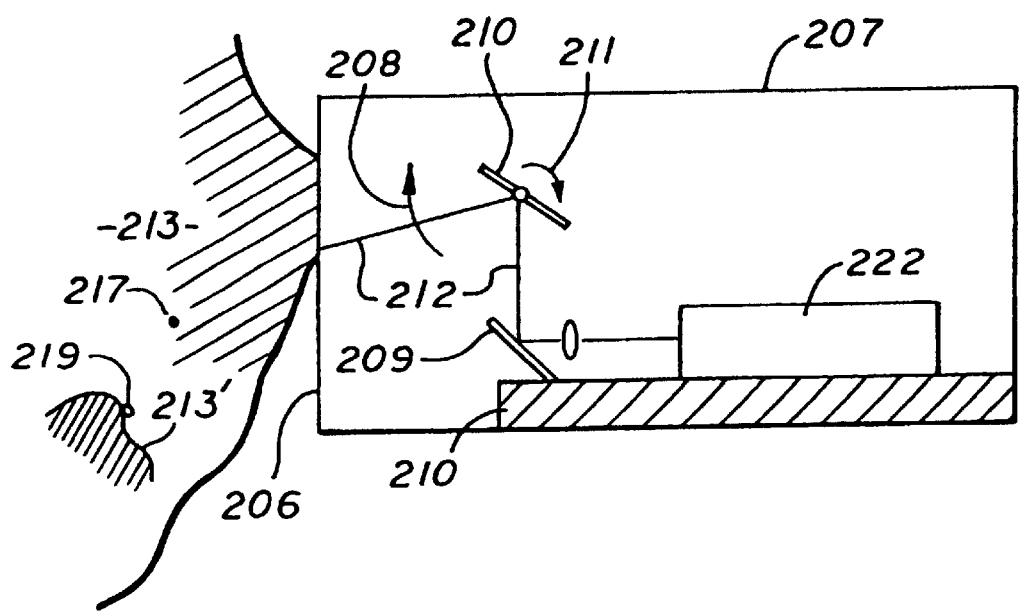
FIG. 1B is a like showing of a medical scanner using a rotating mirror.
Figure 1C:
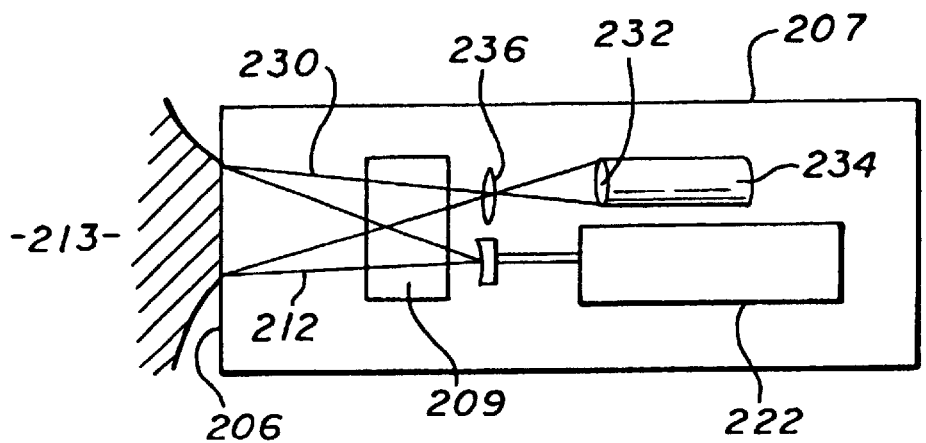
FIG. 1C is a showing in plan of the same device.

FIGS. 1B and 1C show a medical system in which scanning is provided by rotation 211 of a mirror 210. The medium 213 here may be a human breast, or other living tissue.

A window 206 compresses the tissue slightly, for better viewing from within the apparatus housing 207. Mounted within the housing, in addition to the rotating mirror 210, are an optical bench 210, the laser 222, and a lens and a stationary deflecting mirror 209. After traversing that mirror, the pulse beam 212 bounces from the rotating mirror 210 through the window 206 and into the tissue 213.

Objects of interest include tiny tumors 217 embedded in the breast 213, or growing on the surface of a nearby organ 213', which here provides the previously mentioned "far interior surface" of the medium 213. An opaque organ 213', or one whose reflectivity is very different from that of the breast 213, may itself be imaged in relief—i. e., in silhouette.

Figure 1D:
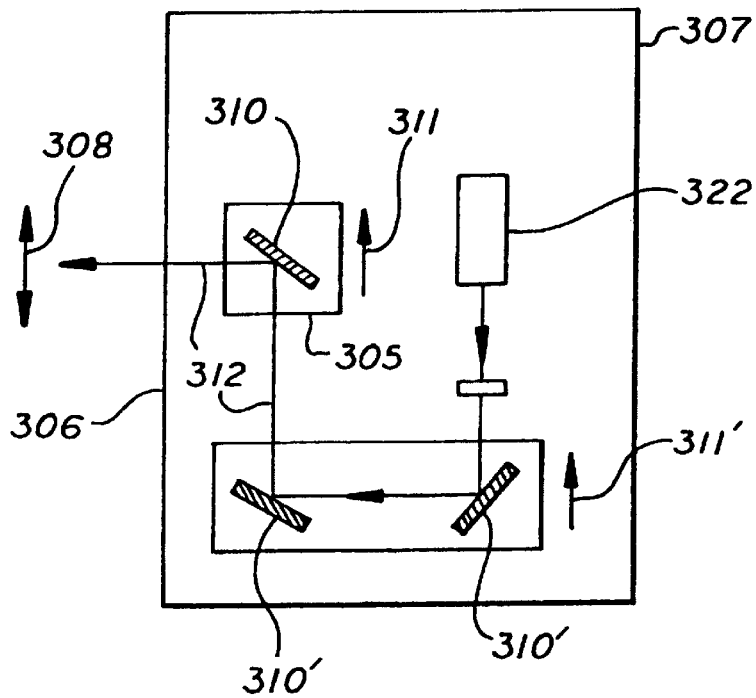
FIG. 1D is a showing like FIG. 1B of a similar scanner but with a translating mirror.

A rotating mirror 210 introduces variations in angle of incidence which may be undesirable in certain sensitive work, and also introduces a variation in the lateral resolution with depth. FIG. 1D shows a similar system in which translation 311 of a mirror 310 is substituted for rotation to avoid these potentially adverse effects.

Here the optical path is folded, using three mirrors 310, 310', which instead translate in synchronism to also avoid variation in focal distance. In FIG. 1D the scanning mirror moves 311 on one table 305, and the two compensating mirrors 310' move 311' in tandem on a second table 304.

The compensating-mirror table 304 moves in the same direction as the scanning-mirror table 305 but at half the speed. The output beam 312 scans 308 linearly, as does the return beam (not shown) which traverses the same path in reverse to hold focus in return as well.

FIG. 1E shows a handheld scanner 580, connected to a picosecond-pulse laser 522 by a flexible fiber-optic coupler 510. The laser pulse is shaped by lenses in the scanner 580 housing, to form outgoing beam 512 which as before exits through a window 506 to illuminate the tissue 513 of a breast, or other living tissue.

Confocal at 512/536 with the laser beam 512 is the return beam 530, which is focused by a lens 536 onto a variable field-limiting slit 526. From the slit the beam traverses another flexible coupler 525 to reach the photocathode 532 of the streak tube 534—with deflecting plates 542, CCD 548 etc. The CCD is coupled to electronics which produces the images 570 of tumors 517 on a CRT display 256.

Alternatively the entire streak tube can be packaged in the handheld unit 580, with cabling from the CCD output to a remote display. In either event, the handheld probe 580 can be readily placed anywhere on the body to probe tissue with a minimum of patient discomfort.

By tilting the probe at a fixed position, the volume of interest can be swept out—or in many situations the face of the probe can be slid along the patient's skin to obtain a more nearly translational scanning. Since imaging is in real time, the clinician can immediately probe areas of interest, generating (and recording for later use) optimal images.

Such easy scanning offers a tremendous advantage over X-rays, MRI, etc., and is generally comparable to current ultrasound technology in ease and noninvasiveness of use. Streak lidar, however, provides orders of magnitude finer resolution than ultrasound.

In operation the only source of motion is an operator's hand-imparted motion of the handheld scanner 580. Some idea of the position of the scanner relative to the breast is desirable, though as will be recognized parts of the body are intrinsically malleable and not readily amenable to precise location.

One way to provide positioning is by inclusion of a three-axis accelerometer 585a, 585b, 585c, with data cables to the electronics for interpretation. Another is passive, using modulation of a magnetic field imposed on the region of the testing laboratory where the scanner 580 is being held. In these two cases, relatively straightforward software must be provided for debriefing the electronics, and calculating and presenting positional data for recording in synchronism with the lidar display 256.

Still another approach is to provide two or more video cameras 581, for recording visual images indicating the scanner's position in synchronism with recording of the CRT display 256, 570. This system requires little or no data processing for scanner-position determination.

Yet another way to provide positioning information is by disposing three transmitters of microwave or like radiation at calibrated points near the test area, and making the previously mentioned units 585a, 585b, 585c microwave triangulation receivers rather than accelerometers. Like the first two positioning systems discussed above, this one does require some data processing.

Figure 1F:
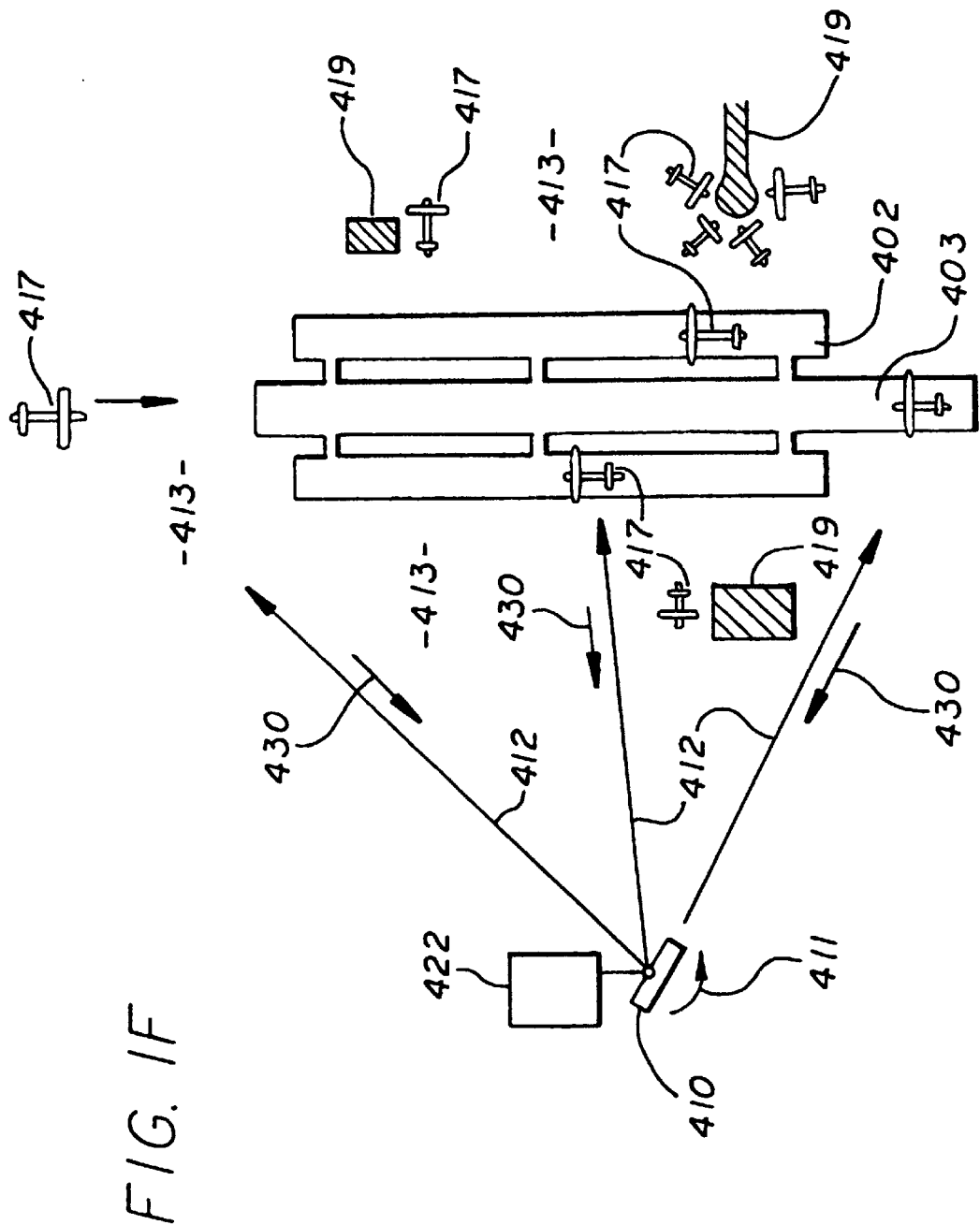
FIG. 1F is a highly schematic plan of an airport scanner.

FIG. 1F represents an airport with a runway, taxiways 402, and fog 413 throughout the area. The pulse beam from the laser 422 is redirected by a rotating mirror 410 to form the probe beam 412, which pierces the fog to image the aircraft 417 on the ground and in the air—as well as buildings 419. The rotation 411 of the mirror unavoidably introduces variations in focus and incidence angle, which in this context are probably immaterial.

Figure 2:
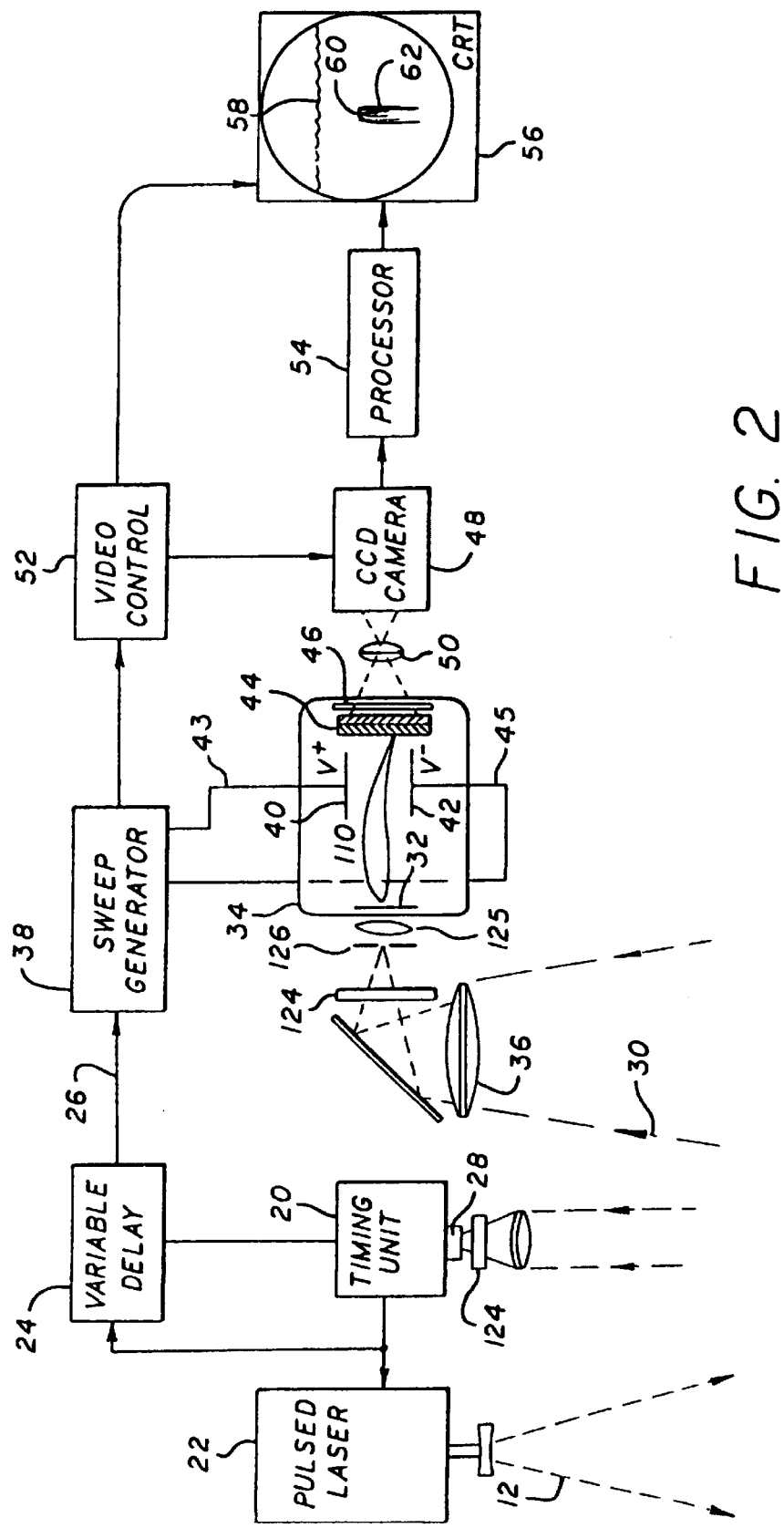
FIG. 2 is a block diagram of a preferred embodiment of the invention.

FIG. 2 shows a block diagram of a preferred embodiment of the invention. A timing unit 20 initiates the probing sequence by causing the laser 22 to emit a narrow, fan-shaped pulse beam 12 to illuminate a thin section of the medium. After the Q-switch 84 (FIG. 5) in the laser 22 has closed, causing the laser to fire, the timing unit 20 initiates operation of the variable delay unit 24.

That unit issues a delay pulse 26 to initiate operation of the receiving unit. To ensure that the delay is correct, a detector 28, such as a photomultiplier, is preferably used to sense reflected portions 30 of the pulse beam. The timing unit 20 measures this time and resets the variable delay unit 24 to ensure that the next delay pulse 26 is correct. Since the delay is variable, the invention can be operated at very different ranges—i. e., from aircraft altitudes to medical-scanner distances.

The reflected portions 30 of the pulse beam are collected and focused on the photocathode 32 of a streak tube 34 by an optical element, shown here as a lens 36. The image, which includes a wide spread of scattered light, is chopped by the field-limiting slit 126 that is aligned with the returned image of the fan-beam, and serves to reject scattered light as well as limit the width of the electron image to a width smaller than the temporal sampling obtained by the pixels in the imaging detector.

For best image quality, a lens 125 or other focal element preferably is positioned as between the field-limiting slit 12 and the photocathode 32, to reimage the image at the field-limiting slit 126 onto the photocathode 32. The photoelectrons 110 emitted from the photocathode 32 are accelerated by the streak-tube anode voltage, and are focused into a line on the anode 44 by the electrostatic or magnetic field distribution in the streak tube 34.

The photoelectrons also are deflected by the electrostatic field set up between the deflection plates 40 and 42 in the streak tube 34. In other words, one field forms the image, and the other field set up between the deflection plates 40 and 42 positions the image.

The delay pulse 26 initiates the action of a sweep generator 38, which causes a linearly increasing voltage 43 and 45 to be applied to the deflection plates 40 and 42 on the streak tube 34. The line-shaped electron image is deflected by the plates 40 and 42 so that the line sweeps across the streak-tube anode 44, thus converting a temporal variation in the input signal into a spatial distribution on the anode 44.

The temporal variation arises from different propagation times into and out of the medium, from the apparatus to each successively illuminated level or depth within the medium, and then back to the apparatus. That time is of course proportional to the distance or depth.

Hence the present invention provides in a very natural and elegant fashion a direct mapping of each such depth, and thus in turn a direct mapping of each section of the turbid-medium volume being scanned, into distance along the anode (and any later display screen).

The anode 44 may be made of a phosphor, but since there are few photoelectrons 110 from the return when the beam has penetrated many diffusion lengths in the medium, additional photon gain is desired. Thus the anode 44 is preferably made of a microchannel plate (MCP) intensifier, which provides the gain required to make photoelectrons 110 detectable.

The electron output of the MCP is reconverted to photons by a phosphor layer 46, so that the image of the temporal variation over the narrow fan-shaped pulse beam 12, now converted to a two-dimensional image, can be coupled to a detector array 48 by a coupling device, such as a lens 50.

Other coupling devices, such as a fiber-optic light pipe, may be used. The detector array 48 shown is a CCD, but it could easily be a diode array, and in particular a photodiode n-channel MOSFET array or diode-limited CCD that provides a logarithmic response to high light levels.

If the accelerating voltage is high, gain can be obtained through the ionization created by the electrons directly in the detector. Thus the anode 44 can be made of a backside thin CCD fabricated for this purpose, and an MCP and phosphor are not required.

Before each new image arrives, the CCD detector array 48 is set to read out the preceding frame, in preparation for receiving the new image. Once the sweep generator has completed the voltage rise and resets, a command is issued to the video control 52 to read the image on the CCD.

The data are then passed to a processor 54, or directly to a cathode ray tube display 56, where a waterfall-like display of the section of the medium probed by the pulse beam 12 can be watched directly. Typical images are that of the surface 58 of the medium, a reflecting object 60 suspended in the medium, and a shadow 62 from the reflecting object.

The subsequent display of such sections can be manipulated by adding many sections together to provide—as previously described—a volume display of the interior of the medium. Specifically, to collect such sections the emitter and sensor systems together can be moved normal to the longitudinal axis of the pulse beam 12 between (and, without any problem, during) each exposure, so that the beams themselves are wholly shifted to illuminate and reflect from adjacent sections of the medium—or portions of the beams can together be shifted by motion of a mirror, lens, fiber-optic image relay, etc. to accomplish a like result.

As described above, the present invention—if used outdoors to probe deep depths—would be limited by sunlight to operation at night only. Daytime operation requires narrow-band interference filters 124, placed in front of the streak-tube cathode 32, to pass the laser wavelength and block all others.

The combination of the filters 124 and the short exposure time for each element in the detector array 48 (typically 5 nanoseconds even for ocean scans, thereby e. g. resolving 56 cm in depth) holds the background at each pixel to at most a few photoelectron counts.

FIG. 3 shows a timing diagram of signals obtained from the reflected portions 30 of the pulse beam. The time history of the reflected portions 30 of the beam is a record of the reflection from the medium itself, and from any bodies suspended in the medium—such as aircraft in fog, mines or submarines in seawater, or tumors in body tissue—including the reflection from the nearest surface of such objects and of the shadow beyond them.

Because the part of the medium illuminated by the pulse beam 12 is limited to a very thin section, the image on the phosphor layer 46 is a wide, deep section of the medium. The image can be photographed by means of a CCD camera or similar device, particularly by logarithmic-response area-array CCD-like detectors, which read out slowly compared to the short duration of the returning signal.

To obtain a higher power-aperture product, we now prefer to use a fiber-optic coupler in place of the lens 48 that is between the streak tube output screen 46 and the CCD or other video camera. Besides increasing the optical power, this substitution also reduces the overall length of the apparatus.

Consequently the phenomena on the cathode ray tube display 56 can be viewed directly, or the image can be processed as at 54 to obtain enhanced imagery after the signal has been encoded. For the latter operation, various common enhancement means, such as subtracting the mean return from the recorded section, can be used.

In the regions of the pulse beam in which there are no objects, as shown in FIG. 3(a), if air (or vacuum) intervenes between the equipment and the medium as in airborne ocean surveillance there is a sharp return from the air-to-medium interface 64 and then a smaller exponential return representing backscatter from the medium itself. The signal ends with a second sharp return 68 from the bottom or far interior surface of the medium, assuming that the system can respond for such a depth.

The range capability of the system depends on the attenuation length of light in the medium traversed. For example, in seawater the attenuation length of light varies from 40 meters, for Jerlov Type I clear ocean water, to a few meters, for Jerlov Type C turbid bay water. Media of even much-denser turbidity, such as living tissue, can be probed equally well, but only to correspondingly much shallower distances—for example perhaps 10 to 30 cm for human flesh.

When the pulse beam encounters a wholly immersed object 17 (FIG. 1), as shown in FIG. 3(b), the reflected portions of the pulse beam are typified by a sharp leading edge 70 which varies over the width of the pulse beam due to the roundness of the object. Following the return is a shadow 72. Thus the combination of the sharp leading edge 70 and the shadow makes up the signature of a suspended or embedded body.

By utilizing the streak tube in a lidar (backscatter) configuration, fully three-dimensional images are obtained; these reveal tumor depth as well as lateral position. This characteristic is highly beneficial in comparison with transillumination systems (heretofore commonly favored in medical work), which as previously mentioned can provide only two-dimensional images and no depth information.

In addition, the lidar signature includes both a reflection and a shadow signature, which in combination may be exploited using matched-filter processing to significantly increase detection range as compared with transillumination images.

One exciting new potential use of optical probing of human tissue, in addition to tumor monitoring, is the exploitation of diferential absorption techniques to image vascular structure, measure total blood volume in tissues, and determine blood oxygenation.

Combination of such spectral techniques with the high-resolution three-dimensional capability of the streak-lidar approach allows precise localization, in three dimensions, and imaging of these features. This is within the scope of certain of the appended claims.

Spectroscopic imaging is based on the fact that, although the wavelength dependence of tissue scattering is small, the wavelength dependence of blood absorption (hemoglobin) is large. Furthermore the optical absorption and reflection spectra of hemoglobin are quite sensitive to blood oxygenation.

For example, the differential absorption between $HbO_2$ and Hb at 760 nm is 0.25/cm m M, resulting in a difference in extinction coefficient of 0.38/cm at typical brain-oxygenation levels. By using two wavelengths, one sensitive to such differential absorption and a reference wavelength relatively insensitive to differential absorption (the isobestic wavelength for hemoglobin is 800 nm), blood oxygenation may be determined independently of total hemoglobin concentration or blood volume.

By also, for example, overlaying the results in different colors, relative blood oxygenation can be displayed in any of various volumetric (e. g., movie-like) fashions similar to those described earlier.

Such spectral dependencies of optical properties can be exploited for multiple applications, such as the following.

(1) Imaging of vascular structure by exploiting the differences in absorption coefficient between blood vessels (hemoglobin) and surrounding tissues:
   The three-dimensional imaging capability of streak-tube lidar allows determination of depth as well as lateral position of the structures.

(2) Determination of tissue blood volume:
   Due to the high absorption of hemoglobin, tissues with elevated blood volume due to internal bleeding or tumors will exhibit significant optical contrast compared with normal tissues. Such optical contrast can be further enhanced by using contract agents such as indocyanine green for targeting of small, rapidly growing tumors which are often characterized by the "leakiness" of their blood vessels.

(3) Determination of blood oxygenation in tissues using differential absorption between $HbO_2$ and Hb:
   Such techniques have been utilized to noninvasively monitor cerebral oxygenation during cardiopulmonary bypass surgery.

Each of these techniques has been demonstrated in transillumination geometries, and resolution of millimeter-scale structures and smaller have been reported. To our knowledge, time resolved backscatter imaging has not been performed. As described above, such a capability as afforded by streak lidar allows depth-resolved imaging to localize structures in three dimensions. This is a unique capability not available from alternative diagnostic techniques.

Streak lidar is entirely capable of multiple-wavelength measurements. A broadband picosecond laser available commercially from optical Sciences is tuneable over the entire visible and near infrared band, and may be configured to successively fire at multiple different wavelengths on a per-shot basis.

The photocathode of the streak tube has a broad spectral response extending to the near infrared. By operating the laser as just described, the streak-lidar system can include spectral resolution with high-resolution three-dimensional imaging.

Also, spectral filters or a dispersive element associated with the streak-lidar receiver enable measurement of fluorescence or Raman-shifted returns. Fluorescent markers can be used for a very great variety of medical observations.

In addition to detecting objects that are wholly embedded (for example, immersed or floating) in the medium, the present invention also detects objects or irregularities 19 (FIG. 1) at the bottom or at a remote interior surface 13' of the medium 13. When the beam encounters such an object 19 as shown in FIG. 3(c), the system detects a return 74 from the object or contour 13' at the bottom or far surface before it detects a return 68 from an adjacent region of the bottom or far surface where no object is present.

Thus, for example, with a profile of the ocean-bottom topography, silt-covered objects such as archaeological remains or mines (FIG. 1A) can be distinguished from the bottom itself.

Figure 4:
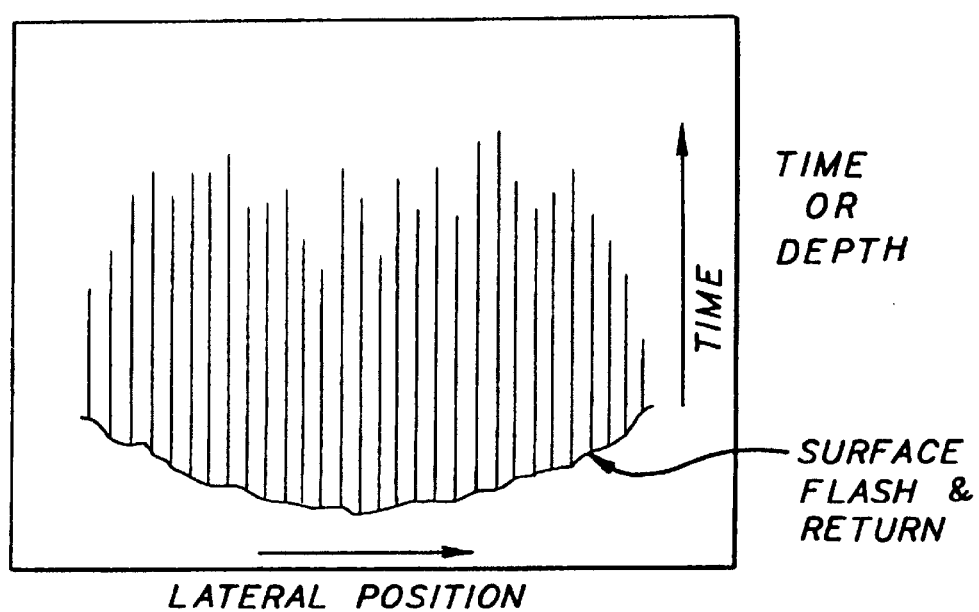
FIG. 4 is a diagram of the beam distribution on the MCP, phosphor and CCD.

A diagram of the beam distribution on the MCP, phosphor and CCD appears as FIG. 4. The task of identifying the various components in the return requires an analysis of the waveforms, such as those shown in FIGS. 3(a) to 3(c), over the width 15 (FIG. 1) of the fan.

This analysis is enabled on an intuitive visual basis by a principal embodiment of the invention, which utilizes the streak tube to present a spatial display of all parts of the fan beam as a direct, real-time map of position versus time, or depth.

Figure 5:
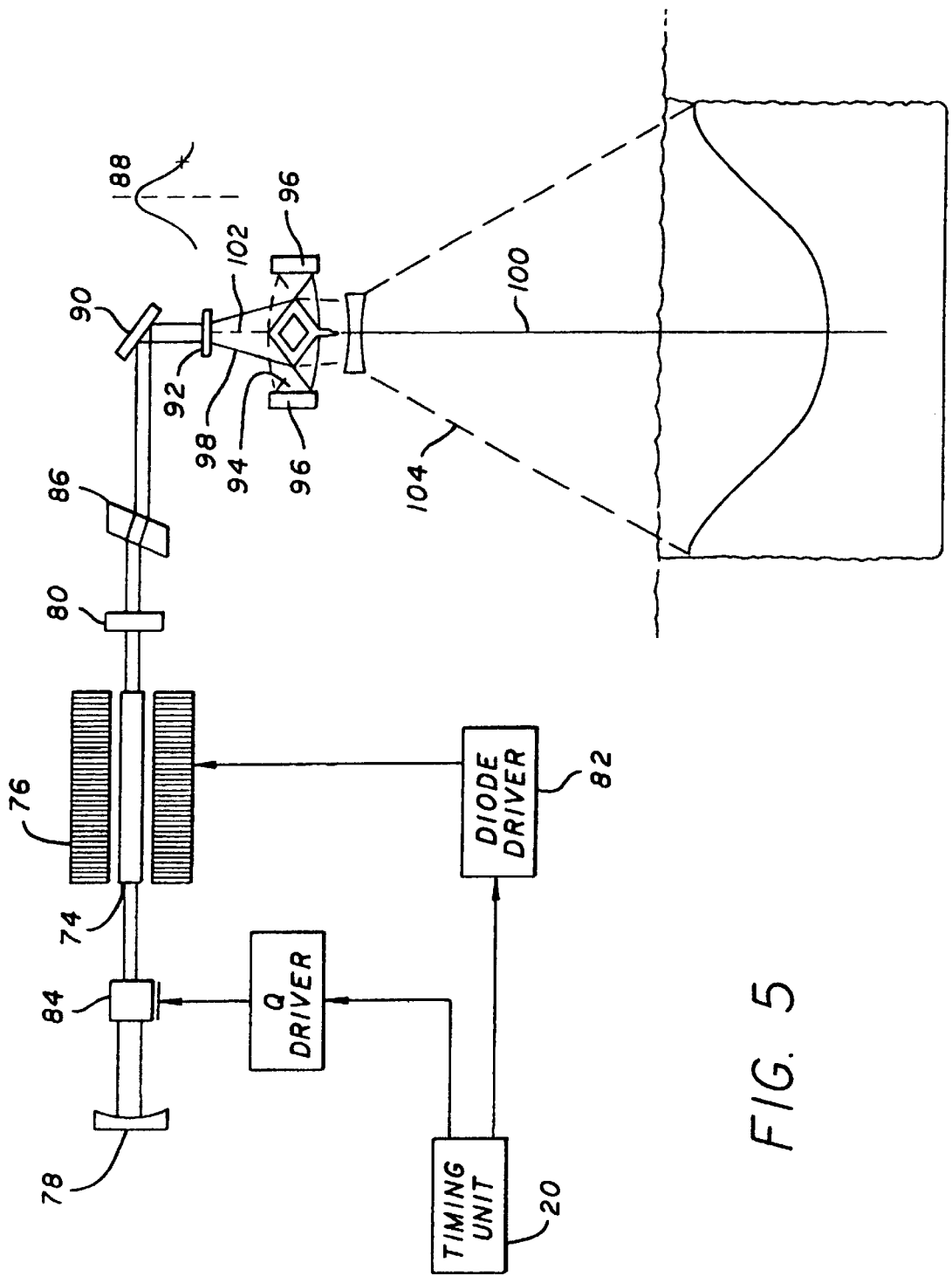
FIG. 5 is a schematic diagram of the laser and the projection optics of the FIG. 2 preferred embodiment.

The laser and the output projection optics are depicted in detail in FIG. 5. For ocean-scanning applications the laser required for the lidar of this invention is a typical Q-switched laser that can produce pulse widths of the order of 5 to 15 nanoseconds. For purposes of illuminating and penetrating the ocean, wavelengths in the vicinity of 470 nanometers are optimum. In very turbid water, however, yellow matter reduces the penetration at this wavelength so that the optimum wavelength can be as long as 532 nanometers. Applicable lasers are doubled Nd-YAG or Nd-YOS, excimer lasers using the C-A transition in XeF, and copper vapor. All of these can provide considerable power, on the order of joules per pulse at the reasonably high rates required for observations from aircraft. Diode-pumped Nd-YAG, for example, could provide 1 joule at 30 Hz.

Shown in FIG. 5 is a typical diode-pumped YAG laser, consisting of the YAG rod 74, diode pumps 76 with a reflector 78, and an output-coupling mirror 80 forming the resonant cavity of the laser. The diode pumps 76 are driven by a diode drive 82 triggered by the timing unit 20. When the rod 74 has been exposed to the pump energy and is maximally excited, the Q-switch 84 is opened and the lasing action sweeps through the excited states to produce an intense short pulse. These lasers commonly emit in the infrared, 1.06 micrometers; however, a nonlinear crystal in the path of the beam 86 can be arranged so that the frequency of the radiation is doubled to give the desired wavelength at 0.53 micrometers.

The output of the laser, for the energy levels required, will be a beam with a half width of 4–6 mm. The beam will be expanded so that it can cover a 5-by-1500-meter area on the ocean surface, from a typical altitude of 1500 m, by means of an anamorphic optical element which has a focal length of −1.5 m aligned with the flight direction. This would produce the 5-meter-wide slice, and a focal length of −7.5 mm focal length in the other direction would produce the 1000 m cross-track illumination.

If the pulse beam is Gaussian 88, an optical inverter can be used to enhance the intensity of the outer portions of the beam. After the beam is directed downward by a mirror 90 and slightly diverged by lens 92, it arrives at a diamond-shaped mirror arrangement 94 which cuts it into two parts, as shown by the dashed lines, and reflects it outward to a set of mirrors 96—which return the beams to the central mirror arrangement 94. Because the beams reflect from three mirrors, the parts of the beam that were outside 98, and were the least intense, now fall at the inside of the beam 100. In the same respect, the parts of the beam that were in the inside 102, which were the most intense, now fall on the outside of the beam 104. This results in an inverted intensity pattern which then compensates for the increased path length to the ends of the pattern and for the cosine losses on illumination and on the return, to provide a more uniform signal over the illuminated region.

FIG. 6 is a schematic diagram of the detection system with the preferred embodiment. The most important part of the detection system is the streak tube. Any of the existing and commercially available designs are applicable to the invention, but there are characteristics which make some streak tubes better than others. The important specifications are cathode size, resolution and speed.

The photocathode 32 should be as wide as possible to permit the use of a large light-collecting optic. This is because the signal E that is collected by a detector element with an area A, in an optical system with a numerical aperture n.a. is given by the equation, $$\underline{E} = \pi \underline{B}(n.a.)^2 \underline{A} \qquad (1)$$

where B=magnetic flux density, and $$n.a. = 1/(2 \cdot f/\#), f = \text{focal length}.$$

The brightness of the lidar return is given by the laser energy, and the highly attenuated scattering from the object, or the medium. The numerical aperture of the light-collecting optics is limited practically to 0.5 (f/1 optics), since the focal length $f$ is equal to the aperture diameter. The only way to obtain an increased signal is to increase the detected sample area on the photocathode. For example, if a 30-mm-long photocathode (which could be as narrow as the field-limiting slit) were used to cover 300 samples over 1500 m of surface, the focal length of the optic could only be as large as 17 mm, and the aperture area to collect the return laser light would only be 2.2 cm², which is very small. Large photocathodes, however, are available in X-ray imaging tubes and scintillation detectors, and electron optics are capable of imaging the photoelectrons. At present, there are intensifier tubes with S-20 300 mm photocathodes that would permit use of light-collecting optics with aperture areas as great as 220 cm². These intensifier tubes have a signal strength a hundred times greater than that of smaller, more readily available tubes. Thus the possibility of building or obtaining a large streak tube what would use the electron optics of larger intensifiers is well within the state of the art.

Again referring to ocean-volume scanning, in order to usefully image a 1500 m swath width, the resolution of the streak tube should be sufficient to permit observing three hundred samples in width and time. (For other applications, depending on desired and feasible image quality, like resolution parameters are appropriate.) Moreover, to view depths of 150 to 300 m in ocean work, a streak tube should have 5-to-10-nanosecond resolution.

For medical applications, 1000 to 10,000 times finer resolution is desired, calling for picosecond pulse widths. Propagation times, round-trip, are also much smaller—on the order of a small number of nanoseconds at most.

Using the known speed of light as $3 \cdot 10^8$ m/sec, these pulse and propagation-time values provide very fine spatial resolutions on the order of 1 psec$\cdot 3 \cdot 10^8$ m/sec=$3 \cdot 10^{-4}$ m, or 0.3 mm; and volume dimensions (e. g., depth) on the order of 1 nsec$\cdot 3 \cdot 10^8$ m/sec=$3 \cdot 10^{-1}$ m or 30 cm. In practice the speed of light is slower by a factor of roughly 4/3 in water and some other turbid media, leading to different resolutions (about 0.2 mm) and volume dimensions (about 20 to 25 cm).

By the phrase "on the order of" we mean to refer to ranges of variation that encompass roughly an order of magnitude, or a half-order in either direction. Thus for example with our invention medical imaging systems may produce resolutions ranging from around 0.07 mm to 0.6 mm (using the half-order-in-either-direction convention) or 0.2 to 2 mm (using a full-order-upward convention).

For medical applications the optimal wavelength is not 0.53 μm as before, but rather in the near infrared at 0.78 to 0.82 μm. Wavelength shifting is feasible to obtain these values too.

Even with a photocathode 32 as large as 300×1 mm, as FIG. 6 shows, the final image can be placed on a CCD as small as 7.5×7.5 mm. (Standard CCD size is 6.6×8.8 mm.) the light 30 from a fast large-aperture light-collecting optic 36 (f/1, 170 mm focal length), shown in FIG. 2, is focused on the fiber-optic input window 106 and passes to the photocathode 32. The extraction electrode grid 108 accelerates the emitted photoelectrons 110, which are focused on the phosphor layer 46 by the focus electrodes 112. A varying voltage on the deflection plates 40 and 42 causes the position of the photoelectron beam 110 to change rapidly, giving an output whose intensity versus distance is proportional to the input intensity versus time.

At the phosphor layer 46, the photoelectrons 110 are converted to photons, with some gain due to the accelerating voltage. The photons are then coupled to a second photocathode 114 at the input of an image intensifier consisting of microchannel plates (MCPs) 116. This permits the event to spread over the MCP structure, to reduce the poor noise factor caused by wide pulse shapes and losses in pore structures that degrade typical MCP performance. At the output of the MCPs 116, a second phosphor layer 118 converts the photoelectrons to photons. The size of the second phosphor layer 118 and the MCPs 116 is about 40 mm, thus permitting a 30×30 mm image area. Typical dynamic electron-optic resolutions and MCP resolutions are on the order of 10 lines/mm.

The last part of the detection system is the coupling of the second phosphor layer 118 to the detector array 122. Coupling to the CCD is often done by a lens 50, as shown in FIG. 2, or by a fiber-optic coupler. The demagnification required is about the same in both cases, as is the loss in gain of 16 that is the result of a 4×reduction to typical 6.6×8.8-mm CCDs containing 25 μm photodetectors.

Commercially available streak tubes have photocathodes up to 30 mm in diameter and output phosphors up to 44 mm in diameter, and may have built-in MCPs. Speed and resolution are compatible with the specifications given above.

For lidar imaging in turbid media there is an optimal choice of receiver field of view to resolve an object at a given depth. Although limiting the field of view rejects scattered light and thus improves target contrast, the resulting lower light levels are accompanied by increased shot noise—which hinders detection.

Conversely, the net lidar return increases with a wider field of view (and lower shot noise), but target contrast is reduced due to the so-called "veiling luminance" generated by multiply scattered light.

For imaging at a given depth in a given turbid medium, the optimum field of view is a compromise between these two extremes. By providing for a variable slit width in the streak-tube receiver, the field of view may be easily adjusted to provide optimal viewing over a wide variety of turbidity conditions and detection ranges.

It will be understood that the foregoing disclosure is intended to be merely exemplary, and not to limit the scope of the invention—which is to be determined by reference to the appended claims.

What is claimed is:

1. A system for imaging a volume of a turbid medium that is living tissue, with objects therein, said system being for use with means for physically shifting at least part of a probe beam and at least part of a reflected beam, together, with respect to said turbid volume, and said system comprising:

means for projecting a pulsed thin-fan-shaped beam to selectively illuminate, along an Illumination-propagation direction, a thin section of such turbid volume;

means for receiving reflected light back, approximately along the illumination-propagation direction, from the thin section of turbid volume; and comprising:

first electronic means for time-resolving said received light to derive therefrom successive electronic representations of the light successively received from the illuminated turbid-volume thin section, and second electronic means for distributing the successive electronic-image representations, along an electronic time axis, said distributing of the electronic-image representations being in accordance with elapsed time after operation of the beam-projecting means so that each electronic-image representation is displaced along the electronic time axis substantially in proportion to total propagation distance and time into and out from the turbid-medium thin section, to form a composite electronic representation of the turbid-volume thin section as a function of propagation depth;

means for imposing a substantially common spatial definition and directional restriction, in one dimension, upon (1) the pulsed thin-fan-shaped beam projected by the projecting means and (2) the reflected light received back from the thin section of turbid volume; and means for sequentially operating the beam-projecting means, during operation of such physically-shifting means, to project a sequence of beam pulses to illuminate successive thin sections, and generate a corresponding sequence of composite electronic representations; and wherein:

the projecting means comprise a pulsed laser that emits a short laser pulse of duration in a picosecond range.

2. The living-tissue turbid-volume imaging system of claim 1, wherein:

resolution is on the order of 0.2 mm.

3. The system of claim 2, wherein:

the projecting means comprise means for forming the beam in plural spectral components;

the receiving means comprise means selectively responsive to the plural components, respectively.

4. The system of claim 3, further comprising:

means for interpreting the plural components in terms of characteristics of said tissue.

5. The living-tissue turbid-volume imaging system of claim 1, wherein:

said overall propagation distance is on the order of 20 to 25 cm.

6. The system of claim 5, wherein:

the projecting means comprise means for forming the beam in plural spectral components;

the receiving means comprise means selectively responsive to the plural components, respectively.

7. The system of claim 6, further comprising:

means for interpreting the plural components in terms of characteristics of said tissue.

8. The living-tissue turbid-volume imaging system of claim 1, wherein:

each composite electronic representation comprises an image of opaque irregularities and contours at a far interior surface of the medium.

9. The system of claim 8, wherein:

the projecting means comprise means for forming the beam in plural spectral components;

the receiving means comprise means selectively responsive to the plural components, respectively.

10. The system of claim 9, further comprising:
means for interpreting the plural components in terms of characteristics of said tissue.

11. The system of claim 1, wherein:
the projecting means comprise means for forming the beam in plural spectral components;
the receiving means comprise means selectively responsive to the plural components, respectively, when received.

12. The system of claim 11, further comprising:
means for interpreting the received plural components in terms of characteristics of said tissue.

13. The system of claim 11, wherein the selectively responsive means comprise:
spectral filters or a dispersive element associated with the receiving means, for measuring fluorescence or Raman-shifted components of a return beam.

14. The system of claim 1, wherein the projecting and receiving means comprise:
a handheld scanner for applying the beam to the tissue and receiving reflected beams therefrom.

15. The system of claim 14, wherein:
the projecting and receiving means are housed within the scanner.

16. The system of claim 1, further comprising:
an optical-fiber coupler between the receiving means and a camera.

17. A system for imaging a volume of a turbid medium that is biological tissue, with objects therein, said system being for use with means for physically shifting at least part of a probe beam and at least part of a reflected beam, together, with respect to said turbid volume, and said system comprising:
means for projecting a pulsed thin-fan-shaped beam to selectively illuminate, along an illumination-propagation direction, a thin section of such turbid volume;
means for receiving reflected light back, approximately along the illumination-propagation direction, from the thin section of turbid volume; and comprising:
first electronic means for time-resolving said received light to derive therefrom successive electronic representations of the light successively received from the illuminated turbid-volume thin section, and
second electronic means for distributing the successive electronic-image representations, along an electronic time axis,
said distributing of the electronic-image representations being in accordance with elapsed time after operation of the beam-projecting means so that each electronic-image representation is displaced along the electronic time axis substantially in proportion to total propagation distance and time into and out from the turbid-medium thin section, to form a composite electronic representation of the turbid-volume thin section as a function of propagation depth;
means for imposing a substantially common spatial definition and directional restriction, in one dimension, upon (1) the pulsed thin-fan-shaped beam projected by the projecting means and (2) the reflected light received back from the thin section of turbid volume; and
means for sequentially operating the beam-projecting means, during operation of such physically-shifting means, to project a sequence of beam pulses to illuminate successive thin sections, and generate a corresponding sequence of composite electronic representations; and wherein:
the projecting means comprise a pulsed laser that emits a short laser pulse of duration in a picosecond range.

18. The system of claim 17, wherein:
the projecting means comprise means for forming the beam in plural spectral components;
the receiving means comprise means selectively responsive to the plural components, respectively.

19. The system of claim 18, further comprising:
means for interpreting the plural components in terms of characteristics of said tissue.

20. The system of claim 19, wherein the selectively responding means comprise:
spectral filters or a dispersive element associated with the receiving means, for measuring fluorescence or Raman-shifted components of a return beam.

21. The system of claim 20, wherein the projecting and receiving means comprise:
a handheld scanner for applying the beam to the tissue and receiving reflected beams therefrom.

22. The system of claim 21, wherein:
the projecting and receiving means are housed within the scanner.

23. The system of claim 22, further comprising:
an optical-fiber coupler between the receiving means and a camera.

24. The biological-tissue turbid-volume imaging system of claim 17, wherein:
resolution is on the order of 0.2 mm.

25. The system of claim 24, wherein:
the projecting means comprise means for forming the beam in plural spectral components;
the receiving means comprise means selectively responsive to the plural components, respectively.

26. The system of claim 25, further comprising:
means for interpreting the plural components in terms of characteristics of said tissue.

27. The biological-tissue turbid-volume imaging system of claim 17, wherein:
said overall propagation distance is on the order of 20 to 25 cm.

28. The system of claim 27, wherein:
the projecting means comprise means for forming the beam in plural spectral components;
the receiving means comprise means selectively responsive to the plural components, respectively.

29. The system of claim 28, further comprising:
means for interpreting the plural components in terms of characteristics of said tissue.

30. The biological-tissue turbid-volume imaging system of claim 17, wherein:
each composite electronic representation comprises an image of opaque irregularities and contours at a far interior surface of the medium.

31. The system of claim 30, wherein:
the projecting means comprise means for forming the beam in plural spectral components;
the receiving means comprise means selectively responsive to the plural components, respectively.

32. The system of claim 31, further comprising:
means for interpreting the plural components in terms of characteristics of said tissue.

* * * * *

UNITED STATES PATENT AND TRADEMARK OFFICE
CERTIFICATE OF CORRECTION

| | | |
|---|---|---|
| PATENT NO. | : 6,873,716 B1 | Page 1 of 1 |
| APPLICATION NO. | : 09/125259 | |
| DATED | : March 29, 2005 | |
| INVENTOR(S) | : J. Kent Bowker, Stephen C. Lubard and John W. McLean | |

It is certified that error appears in the above-identified patent and that said Letters Patent is hereby corrected as shown below:

Column 8,
Line 50, change "three-dimensional" to -- two-dimensional --.

Signed and Sealed this

Twentieth Day of June, 2006

JON W. DUDAS
*Director of the United States Patent and Trademark Office*